(12) United States Patent
Vermeulen

(10) Patent No.: US 8,956,714 B2
(45) Date of Patent: Feb. 17, 2015

(54) METHOD AND APPARATUS FOR MANUFACTURING LAMINATE FLOOR PANELS COMPRISING A CORE CONTAINING WOOD/PLASTIC COMPOSITE, AS WELL AS SUCH PANELS

(75) Inventor: Bruno Paul Louis Vermeulen, Aldeneik-Maaseik (BE)

(73) Assignee: Spanolux N.V.-DIV. Balterio, Sint-Baafs-Vijve (BG)

( * ) Notice: Subject to any disclaimer, the term of this patent is extended or adjusted under 35 U.S.C. 154(b) by 1398 days.

(21) Appl. No.: 12/594,989

(22) PCT Filed: Apr. 10, 2008

(86) PCT No.: PCT/EP2008/054365
§ 371 (c)(1),
(2), (4) Date: Oct. 7, 2009

(87) PCT Pub. No.: WO2008/122668
PCT Pub. Date: Oct. 16, 2008

(65) Prior Publication Data
US 2010/0055420 A1  Mar. 4, 2010

(30) Foreign Application Priority Data

Apr. 10, 2007 (EP) .................................. 07007361

(51) Int. Cl.
*B32B 5/16* (2006.01)
*B27N 3/06* (2006.01)
(Continued)

(52) U.S. Cl.
CPC ... *B27N 3/06* (2013.01); *B32B 5/18* (2013.01); *B32B 21/02* (2013.01); *B32B 21/06* (2013.01);
(Continued)

(58) Field of Classification Search
USPC ................... 428/195.1, 201, 206, 207, 211.1
See application file for complete search history.

(56) References Cited

U.S. PATENT DOCUMENTS

| 4,609,519 A | 9/1986 | Pichard |
| 5,047,282 A * | 9/1991 | Mier ............................. 428/204 |

(Continued)

FOREIGN PATENT DOCUMENTS

| CA | 2518564 | 5/2006 |
| CN | 2122719 U | 11/1992 |

(Continued)

OTHER PUBLICATIONS

B.E. Fisher: "Floorward Thinking", Environmental Health Perspectives, vol. 107, No. 7, Jul. 1999, pp. A-362-A364, XP002606371.
(Continued)

*Primary Examiner* — Bruce H Hess
*Assistant Examiner* — Christopher Polley
(74) *Attorney, Agent, or Firm* — Steven M. Koehler; Westman, Champlin & Koehler P.A.

(57) ABSTRACT

The invention relates to a method of manufacturing laminate floor panels comprising at least a core containing wood/plastic composite (WPC) and a top layer of laminate. It includes the step of providing a granulate of WPC in which natural fibers are encapsulated in polymer plastics. There is provided a layer of granulate which is melted. The melted layer is pressed for forming the core of the panels. The top laminate is attached onto the core to form a sheet (S), and the sheet is finished to form one or more panels. The laminate panel comprises a core made of WPC, a basic layer melted to the core and a top laminate comprising at least one paper layer impregnated with impregnation material, such as melamine resin, and being attached to the basic layer through this impregnation material, or a plastic layer melted to a glass fiber basic layer.

11 Claims, 2 Drawing Sheets

(51) Int. Cl.
*B32B 5/18* (2006.01)
*B32B 21/02* (2006.01)
*B32B 21/06* (2006.01)
*B32B 21/14* (2006.01)
*B32B 27/10* (2006.01)
*B32B 27/30* (2006.01)
*B32B 27/32* (2006.01)
*B32B 37/24* (2006.01)
*B32B 37/04* (2006.01)
*B32B 37/08* (2006.01)
*B32B 37/10* (2006.01)

(52) U.S. Cl.
CPC ............... *B32B 21/14* (2013.01); *B32B 27/10* (2013.01); *B32B 27/304* (2013.01); *B32B 27/32* (2013.01); *B32B 37/24* (2013.01); *B32B 37/04* (2013.01); *B32B 37/08* (2013.01); *B32B 37/1027* (2013.01); *B32B 2260/028* (2013.01); *B32B 2260/048* (2013.01); *B32B 2262/067* (2013.01); *B32B 2264/067* (2013.01); *B32B 2305/70* (2013.01); *B32B 2307/75* (2013.01); *B32B 2317/12* (2013.01); *B32B 2451/00* (2013.01); *B32B 2471/00* (2013.01)
USPC ........ 428/201; 428/195.1; 428/206; 428/207; 428/211.1

(56) References Cited

U.S. PATENT DOCUMENTS

| | | | |
|---|---|---|---|
| 5,662,981 | A | 9/1997 | Olinger |
| 6,217,700 | B1 | 4/2001 | Knobel |
| 2005/0029709 | A1 | 2/2005 | Jo |
| 2005/0287347 | A1* | 12/2005 | Sorrentino ............. 428/304.4 |
| 2006/0032175 | A1 | 2/2006 | Chen |
| 2010/0055420 | A1 | 3/2010 | Vermeulen |

FOREIGN PATENT DOCUMENTS

| | | |
|---|---|---|
| CN | 1912299 A | 2/2007 |
| EP | A-1591214 | 11/2005 |
| EP | A-1721715 | 11/2006 |
| EP | A-1847385 | 10/2007 |
| FR | 2542666 | 9/1984 |
| FR | A-2589777 | 5/1987 |
| WO | WO 99/26773 | 6/1999 |
| WO | WO 00/78541 | 12/2000 |
| WO | WO 2008/122668 | 10/2008 |
| WO | WO 2012/001109 | 1/2012 |

OTHER PUBLICATIONS

"Ionomere" In: J. Falbe & M. Regitz: "Römpp-Lexikon Chemie", 1997, Georg Thieme Verlag, Stuttgart (DE), XP002606372, ISBN: 3-13-734810-2, vol. 3, p. 1979.

"DuPont™ Bynel®—More Choices, More Options, More Answers", E.I.du Pont de Nemours and Company, Sep. 9, 2005, Retrieved from the Internet: URL:http://www.dupont.com/packaging/products/bybel/pdsprint/choices.html [retreived on Oct. 21, 2010].

"Stratica Installation Checklist", Apr. 23, 2010, pp. 1-2, XP55007593, Retrieved from the Internet: URL:http://www.amtico.com/uploadedFiles/Resources/UK/Information_and_Advice?Stratica Installation Checklist.pdf [retrieved on Sep. 20, 2011].

Jin S H: "Panel having printed layer on surface layer of the panel and process of manufacturing the same, which forms the printed layer on the surface layer by dye sublimation transcription", WPI/Thomson, vol. 2007, No. 6, Jun. 19, 2006, XP002587576,abstract.

Preliminary Amendment of U.S. Appl. No. 13/807,497, filed Dec. 28, 2012, which is a national stage filing of PCT/EP2011/061017 filed Jun. 30, 2011 (published as WO 2012/001109).

Notification of the First Office Action, Chinese Application No. 200880018347.1, filed Apr. 10, 2008, mailed Apr. 24, 2012, 11 pages.

Russian office action, Application Serial No. 2009137470/05, filed Apr. 10, 2008, mailed Apr. 16, 2012, 4 pages.

Written Opinion of the European Patent Office in counterpart foreign application No. PCT/EP2008/054365 filed Apr. 10, 2008.

Search Report of the European Patent Office in counterpart foreign application No. PCT/EP2008/054365 filed Apr. 10, 2008.

Office Action from the Canadian Intellectual Property Office dated Jan. 22, 2014 from corresponding Canadian Application No. 2,683,707.

* cited by examiner

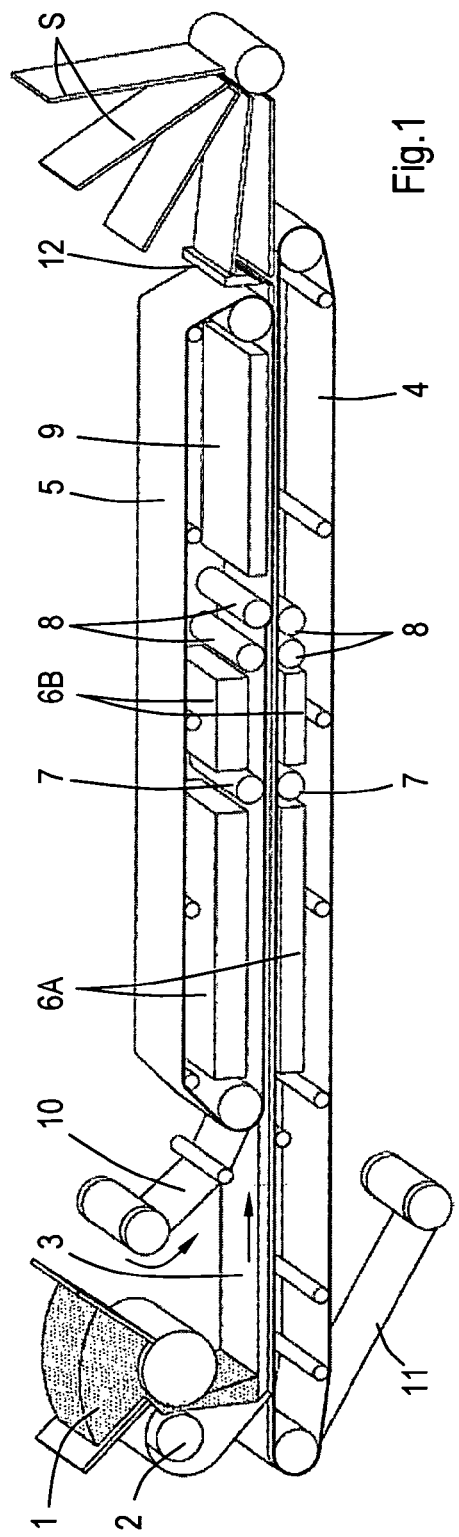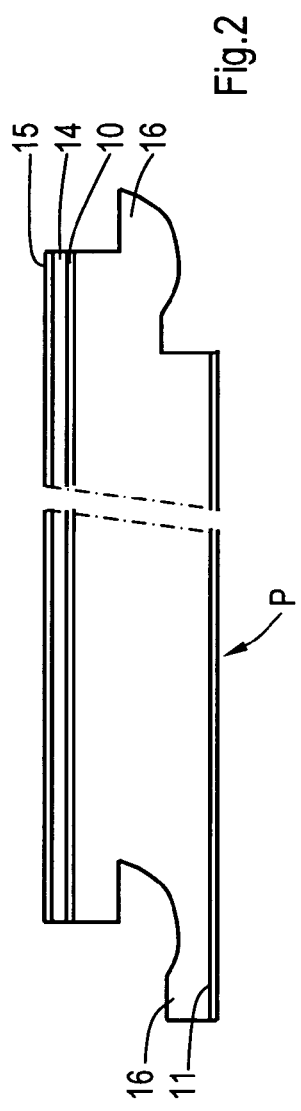

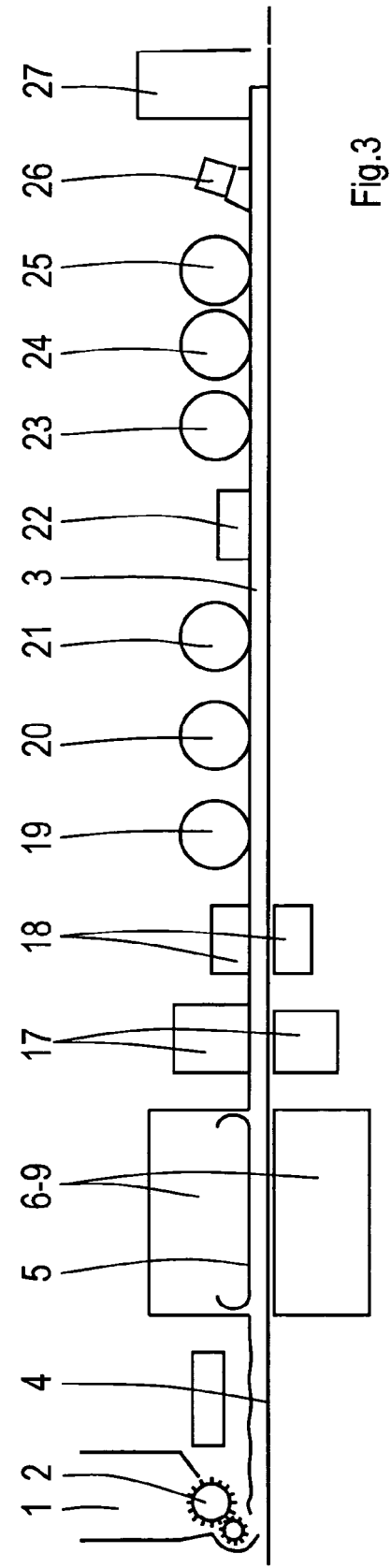

METHOD AND APPARATUS FOR MANUFACTURING LAMINATE FLOOR PANELS COMPRISING A CORE CONTAINING WOOD/PLASTIC COMPOSITE, AS WELL AS SUCH PANELS

CROSS-REFERENCE TO RELATED APPLICATION

The present application is a national stage filing of International patent application Serial No. PCT/EP2008/054365, filed Apr. 10, 2008, and published as WO 2008/122668 in English.

BACKGROUND

The discussion below is merely provided for general background information and is not intended to be used as an aid in determining the scope of the claimed subject matter.

Aspects of the invention relates to a method of manufacturing laminate floor panels comprising at least a core containing wood/plastic composite (WPC) and a top layer of laminate, including the steps of providing a granulate of WPC in which natural fibers are encapsulated in polymer plastics, forming the core of the panels, attaching the top laminate onto the core to form a sheet and finishing the sheet to form one or more panels. Another aspect relates to an apparatus for manufacturing laminate floor panels and to a new type of laminate floor panels.

A method as described above is for example known from US 2006/0032175 A1. This document discloses flooring products and methods of making the same. The plank described therein comprises a core of WPC and on top of it a print layer and an overlay forming the top laminate. The WPC core is made by an extrusion technique to either make an 100% solid core or to make a core having one or more cavities or cells. The laminate is formed first and once it is formed it can be applied onto the core and is fixed thereto by an adhesive, preferably a hot melt adhesive such as hot melt glue like hot melt polyurethane glue.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the invention provides a method of manufacturing laminate floor panels, including providing a layer of granulate and melting it and pressing the melted layer for forming the core of the panels.

This is an easy and low cost manner of manufacturing laminate floor panels while this method also enables to produce a high quality core for the panels.

Preferably a layer of paper, glass fiber, foil or the like is provided on the melted layer of WPC granulate in order to be pressed together with the core sheet.

This method has the advantage that this layer can be used to provide an attachment base for the top laminate. The top laminate is often made of one or more paper layers immersed or impregnated with (melamine) resin and it is not easy to attach such laminate to the WPC core. It requires the use of a separate glue to effect the attachment. According to the invention this glue is not required anymore as a layer of paper or the like, which is melted to the core, forms a proper base to attach the laminate to the core by means of the resin. This is an environmentally favorable manner of attachment. The layer also creates a stable product and may cause a better and more uniform cooling of the WPC material, leading to less internal tension and thus reduced warping. The layer may also obviate the need for a fine finishing of the top side of the panel. The layer may have such constitution that it only allows passage of heat in one direction. This insulating effect (in the direction of the WPC material) can be used to prevent the WPC material to melt again if further layers are attached to the basic layer under heat, for example a DPL laminate is pressed to the basic layer in a hot press which can have a temperature of up to 200° C. This temperature will melt the laminate to the basic layer, but will not reach the WPC core due to the insulating properties of the basic layer. If the layer is a glass fiber layer or the like, the core may be used as a base for foamed PVC or such plastic material which leads to a vinyl-type laminate on a WPC carrier.

An efficient manner of pressing is obtained when the melted WPC layer is pressed in a continuous process to form a continuous sheet web which is cut into separate sheets which are used as a basis to form one or more panels. If a paper layer should be melted to the core, it is advantageous that the paper layer is supplied in the form of a roll of paper which is unrolled in order to be superposed with the melted WPC layer.

In a further embodiment of the method according to the invention a second layer of paper is provided to the melted layer of WPC granulate on the opposite side so as to form papers layers on both sides of the sheet core. Due to this provision of paper layers on both sides of the core it is easier to control the proper cooling of the panel without the risk of warping of the sheet. A further advantage of the paper layers is that they prevent adherence of the polymers of the WPC core to the press, for example to the conveyer belt of a continuous press.

As an alternative to attaching a paper layer to the melted core and then attaching a laminate to the paper layer, it is proposed to directly provide the whole top laminate or a part thereof on the melted layer of WPC granulate in order to be pressed together with the core sheet.

This method obviates the need to attach the top laminate to the core in a separate step. It enables to manufacture the complete sheet in a single step of pressing the core and attaching the required layers to it in a single step.

Making and finishing the panels include cutting the sheets into separate panels and also machining and finishing the edges of the panels in order to form coupling members and optionally locking members in order to enable the panels to be coupled to each other.

An aspect of the invention also includes an apparatus for manufacturing laminate panels, including a granulate supply to supply a layer of WPC granulate, a heater to heat the granulate to a temperature in which the granulate is substantially in a melted state, and a press to press the granulate into the sheet having the proper dimensions. It preferably comprises means to supply one or more layers of paper or other web-shaped material, such as glass fiber or a foil, to the press in order to be attached to the melted core during pressing.

Furthermore an aspect of the invention includes a laminate panel, comprising a core made of WPC, a basic layer melted to the core and a top laminate comprising at least one layer attached to the basic layer, for example a paper layer impregnated with impregnation material such as melamine resin and attached to the paper basic layer through this impregnation material, or a foamed PVC layer melted to a glass fiber or foil basic layer.

BRIEF DESCRIPTION OF THE DRAWINGS

Aspects of the invention will hereafter be further illustrated with reference to the drawing showing an embodiment of the invention by way of example.

FIG. 1 is a very schematic representation of an apparatus for manufacturing laminate panels according to aspects of the invention.

FIG. 2 is an enlarged sectional view of a panel made in accordance with aspects of the present invention.

FIG. 3 is a very schematic representation of an alternative apparatus for manufacturing another embodiment of the laminate panels according to aspects of the invention.

DETAILED DESCRIPTION OF THE ILLUSTRATIVE EMBODIMENTS

With reference to the drawings and in particular FIG. 1 thereof, there is shown an apparatus for manufacturing laminate sheets S which may include a plurality of panels P (see FIG. 2) which are cut from the sheets S and are finished in a manner well known in the prior art.

The apparatus includes a granulate supply 1 including a mechanism 2 which is adapted to supply a layer of granulate 3 on a supporting conveyor belt 4.

The granulate 3 is made from wood/plastic composite which is a material known in the prior art. It may include from about 30 wt % to about 95 wt % of at least one polymeric material and from about 5 wt % to about 80 wt % of at least one natural fiber or flour by weight of the core. The polymeric material can be one or more polymers having a polyolefin group, such as polyethylene. Other exemplary polymers include polypropylene, polyvinyl chloride, copolymer of PVC, and also other suitable thermoplastics. The polymer material to be processed can be in powder, liquid, cubed, pelletized form and/or any other form. The polymeric material can be virgin, recycled or a mixture of both. The polymeric material can be incorporated with a blowing agent to make a cellular foam structure core.

The natural fibers of flour have a specific moisture content, depending on the WPC-board specifications and requirements. The natural fibers can be from any wood source, cellulose source, other natural sources, or any combination thereof. Generally, any natural fiber can be used, which is from trees, plants, parts thereof and the like. The specific selection of a particular type of wood and/or wood fibers can have an influence on the properties of the final panel. The fibers of an exotic hard wood type could for example be substantially thicker and/or longer than normal fir wood. The bending stiffness will be higher if the WPC core is made with longer fibers. Synthetic fibers may also be used to enhance mechanical properties such as flexural and tensile modules of the product. The natural fiber or flour can be virgin, recycled or a mixture of both. Furthermore the natural fibers or flour can be incorporated with a foaming agent to make a cellular foam structure core.

The mechanism 2 may include a system provided by Schilling-Knobel GmbH, as is described in WO 99/26773, which is incorporated herein by reference thereto, including a hopper which is resting on a metering roller which picks up the material to be scattered on the conveyor belt 4. Other means are of course conceivable.

The lower conveyor belt 4 has a greater length than a second, upper conveyor belt 5 which is positioned at a distance from the granulate supply 1.

The upper and lower conveyor belt 4, 5 run over a certain length parallel to each other and include various zones. The first zone in the direction of conveyance of the conveyor belts 4, 5 is a heating zone 6. In this zone, the WPC granulate is heated to such temperature that the granulate melts to a sufficient extent in order to weaken to a mass which can be shaped into a solid continuous sheet. The heating temperature depends on the polymer used in the WPC granulate and can for example be between 180° C. and 250° C. In this exemplary embodiment, the heating zone 6 is divided in a first heating zone 6A and a second heating zone 6B with nip rollers 7 in between. These nip rollers 7 are positioned below the transport part of the lower conveyer belt 4 and above the transport part of the upper conveyor 5 to effect a first pressing action on the layer of melted granulate. A second set of nip rollers 8 consisting of two pairs of upper and lower nip rollers effects a final pressing action on the layer of melted granulate and determines the final thickness of the sheet to be formed.

The last zone within the conveyor belts 4, 5 is an annealing zone 9 by which the sheet layer 3 is cooled and brought in its final form. The conveyor belts 4, 5 are formed by two reinforced, thermally stable coated belts, for example from glass plus Teflon®. The back sides of the belts are in contact with heating platens in the heating zones 6A, 6B and with cooling platens in the annealing zone 9. The platens in the upper conveyor belt 5 are movable in vertical direction, while the platens in the lower conveyor belt 4 are rigidly mounted. The movability of the platens with the upper conveyor 5 is to create a gap according to the required thickness of the sheet to be formed. In principle, the heating and cooling platens do no exert pressure on the granulate layer and only the calibrating nip rollers 7, 8 are adapted to exert a pressure on the melted granulate layer to determine the thickness thereof.

According to an aspect of the invention, there is supplied a layer of paper or other absorbing material 10, 11 to the lower and upper side of the layer of granulate 3 in order to be melted thereto, i.e. to be attached thereto through the melted plastic from the granulate. The paper layers 10, 11 are supplied by unwinding it from a supply roll. The paper layers 10, 11 are interposed between the granulate layer 3 and either the lower conveyor belt 4 or the upper conveyor belt 5, so that they also assist in preventing the granulate layer from sticking to the conveyor belts 4, 5. The conveying speed of the paper layers 10, 11 will be adapted to that of the conveyor belts 4, 5 so that they are matching, but it is also possible that the paper is not positively supplied, but is pulled away by the friction between the paper layer and the granulate layer 3 and/or the conveyor belts 4, 5.

At a position downstream of the upper conveyor belt 5 there is arranged a cutting mechanism 12 to cut the continuous sheet web into separate sheets S which are then collected for further processing.

FIG. 2 shows a final panel made in accordance with the method illustrated in FIG. 1, in which the panel includes a core 3 made of WPC granulate.

The panel according to FIG. 2 includes a top laminate on the core 3. In this example, the top laminate is a high pressure laminate construction comprising at least a printed decorative layer 14 and an impregnated protective overlay 15 pressed together with heat and pressure to become one single layer due to the impregnation material which is preferably a resin such as melamine resin. Preferably the melamine resin is mixed with urea formaldehyde to obtain advantageous properties such as minimized shrinkage and reduced cloudiness.

The overlay paper 15 is preferably a high abrasive overlay which preferably has aluminium oxide or other abrasive resistant hard particles embedded in the surface of the paper.

The top laminate or top layer as described above consists of one or more paper layers, but also one or more wood veneer layers, vulcanized cellulose layers or other layers suitable as top layer are conceivable according to the present invention The design and overall upper layers can be textured such as embossed in register with the design of the printed decorative layer in order to even better imitate natural material, such as stone, brick, ceramic, wood, marble or the like.

Preferably but not necessarily a backing layer is provided below the core and is fixed to the underside of the core layer 3, possibly with interposition of a paper layer 10. The backing layer can be used as a balancing layer and it may also consist moisture resisting properties.

At least on two opposite sides of the panels and preferably on all sides are formed couplers 16 to couple adjacent panels together. Preferably the couplers also include a mechanical locking system to lock the adjacent panels not only in a direction perpendicular to the surface of the panels, but also in a direction parallel to the surface and perpendicular to the respective side of the panel. However the invention is not limited thereto at all. All coupling systems, including the use of adhesives is encompassed by the invention.

An alternative method of manufacturing the panels according to the invention is one in which a top laminate and optionally also a backing layer is fixed directly to the core simultaneously with the formation of the core sheet. This means that the (paper) layers 10 and 11 are then formed by the materials for forming the top laminate and the backing layer which are directly fixed to the core by adherence to the melted core. The top laminate should then be of such structure that it can be supplied in rolls and can be fixed directly to the core through the basic layer thereof. The top laminate or top layer may consist of paper layers, but also one or more wood veneer layers or vulcanized cellulose layers are conceivable according to the present invention as long as they withstand the heat during pressing.

Another alternative method of forming the panels according to the invention is schematically shown in FIG. 3. This method is intended to directly print a decoration on the WPC core. The apparatus includes the granulate supply 1, the layer making mechanism 2, the conveyor belts 4, 5 and the heating and pressing zones 6-9. It further includes a chafing device 17 to smoothen at least the upper surface, and preferably both surfaces of the WPC core 3, a corona surface treatment device 18 to increase the surface tension of at least the upper surface, but preferably both surfaces of the WPC core 3 so as to promote adherence of a layer thereon. The first layer to be provided on the WPC core 3 is a primer, a second layer is a covering layer of preferably a white color and a third layer is a fond coloring layer having the basic color of the final décor. These layers may be paint layers which are provided by rollers 19, 20 and 21 or other coloring supply means. In the flow direction behind these rollers is a chafing device 22 followed by rollers 23, 24 and 25 to supply a décor coloring layer, an anti-wear layer and a top layer. Finally there is arranged a cutter 26 to cut the web into smaller sheets and a preceding camera 27 to control the cutter 26. Thus, this method is used to provide a top laminate of coloring layers directly on the core of WPC.

From the foregoing it follows that the invention provides panels for flooring or other coverings, such as wall and ceiling coverings, which have excellent qualities, such as acoustical characteristics (airborne as well as impact sound), a better water or humidity resistance (in comparison to MDF/HDF board), an anti or a-static behaviour, with maintenance of many of the qualities of MDF/HDF based laminate panels.

The invention is not limited to the embodiments shown in the drawings and described above, which may be varied in different manners within the scope of the invention. For example it is conceivable to combine the WPC core 3 with another layer of material. For example the complete core may include a base layer of a material such as HDF and a superposed layer of WPC. The connection between these layers can be accomplished after formation of the WPC, or the WPC layer can be formed on the base layer. Other layers may be combined with the WPC, either on, below or within the WPC core. The WPC core may be formed in more than one pressing steps, for example to create several WPC layers within the core having different characteristics. For example a low density WPC layer may be sandwiched between layers of WPC having a higher density. It is also possible to combine layers of WPC that have been optimized for various purposes: a layer having favourable acoustic properties, a soft upper layer to promote deeper embossing, a soft lower layer to enhance the equalizing capability.

Furthermore, it is possible that the decorative print is provided on the (paper) layer that is attached to the WPC core during the formation thereof. No separate laminate is necessary then. The print may be provided before or after attachment to the WPC core. The layer may be covered by resin and optionally anti-abrasive particles as a finish. In a further alternative embodiment, the WPC material is directly printed with a decorative print, so without interposition of a print layer such as paper. As an alternative or additionally, the raw WPC material can be embossed and/or chafed/sanded in a particulate pattern to imitate natural materials such as wood or stone.

The invention claimed is:

1. A laminated panel, comprising:
    a core comprising a pressed composite containing polymeric material,
    a basic layer directly joined to a surface of the core,
        wherein the surface of the core is melted to directly adhere the core and basic layer, and
    a top laminate support by the basic layer, the top laminated comprising a plurality of layers, disposed on a top side of the basic layer opposite the core.

2. The laminate panel of claim 1, wherein the basic layer is made of a paper.

3. The laminate panel of claim 1, wherein the top laminate includes an anti-wear layer and a top layer.

4. The laminate panel of claim 1, wherein at least the top laminate is textured.

5. The laminate panel of claim 1, wherein the basic layer is one of a paper, glass fiber or foil layer.

6. The laminate panel of claim 1, wherein the polymeric material containing composite is wood/plastic composite (WPC).

7. The laminate panel according to claim 1, wherein the basic layer is made of an absorbing material.

8. The laminate panel according to claim 1, wherein a second layer of material is attached to a second surface of the core on a side of the core opposite to that of the top laminate.

9. The laminate panel according to claim 8, wherein the second layer of material is attached to the second surface of the core on the side of the core opposite to that of the top laminate without the use of a second separate adhesive.

10. The laminate panel of claim 9, wherein the second layer of material is bonded directly to the second surface of the core on the side of the core opposite to that of the top laminate without the use of the second separate adhesive, but rather with a bond exhibiting melting of a second layer of the core comprising the second surface of the core.

11. The laminate panel of claim 10, wherein the second layer of material comprises absorbing material.

\* \* \* \* \*